United States Patent Office 3,393,042
Patented July 16, 1968

3,393,042
CHEMICAL PRESERVATIVES AND USE THEREOF
David Y. L. Liu, Park Forest, Ill., assignor to Nalco Chemical Company, Chicago, Ill., a corporation of Delaware
No Drawing. Filed Mar. 6, 1964, Ser. No. 350,073
10 Claims. (Cl. 21—58)

This invention concerns the prevention and inhibition of chemical deterioration or spoilage of organic substances due to static microbic attack. With more particularity the present invention is concerned with the preservation of water-dispersible organic compounds which are susceptible to attack by microorganisms due to their ability to be utilized as fermentable nutrients. Specifically, the compositions useful in preventing said deterioration and methods for their use will be discussed.

The chemical break-down of many organic materials due to the degradative action of microorganisms has long been a problem throughout many industries. A major problem exists when these organic substances are stored for considerable periods of time, and may be utilized as nutrients by various microbes. Bacteria, fungi, and yeasts thrive on many kinds of organic matter when the appropriate conditions of temperature, pH and moisture are present. The organic matter is utilized in the life cycle of these microorganisms, and consequently broken down chemically to the point where they can no longer be suitably utilized in any further industrial process. Since these nutrient materials must necessarily be stored sometimes for substantial lengths of time, the industrial user is compelled to protect them from microbiological deterioration. This storage problem is prevalent in almost any industry in which large volumes of additives must be kept on hand for subsequent incorporation into base products. For example, paper manufacturers store a wide variety of paper additives, portions of which are periodically used when necessary.

This problem of preservation becomes materially worse when organic material are stored as diluted aqueous solutions or dispersions. This environmental medium enhances static microbic attack, and causes accelerated chemical degradation. Susceptible organic ingredients may be so altered that they can no longer be used. Even if the products are not grossly contaminated, there is always the possibility of partial break-down causing severe odor problems and/or subsequent finished product contamination. Of course, long storage time increases the probability of complete spoilage of both additives and finished products. An example of a long time storage problem is characterized by the storage of water-based paints for sometimes two or three years before industrial or consumer use.

The types of organic matter which are particularly susceptible to static microbic attack are carbohydrates, proteins, and synthetic organic materials. The paper industry, for example, employs many such materials for coating colors, size solutions, and adhesives. These substances are all capable of fermentation due to microbiological attack. The majority of them are stored as aqueous solutions for ready incorporation into the cellulose fibers. Examples of additives which must be stabilized from chemical degradative microorganism attack are starch, dextrin, glucose, casein, soya protein, animal and fish glues, sodiumcarboxymethyl cellulose, polyvinyl chloride-butadiene copolymers, polyvinyl acetate latexes, acrylates, and others.

Problems with spoilage in storage are not limited to paint and paper industries but are also prevalent in the plastic, leather, and rubber industries. For example, dispersions of rubber latex are frequently stored for long periods of time and are therefore susceptible to degradation. In addition, many types of organic additives which go to make up the finished plastic or resinous product must necessarily be stored for varying lengths of time. Also to impart the desired finish to many leather products various spoilable organic materials must be incorporated therein during tanning and finishing. These must be stored for ready use, in order to maintain efficient production.

In addition to the many types of problems discussed above, wherein stored organic material may be susceptible to microbiological attack, aqueous inorganic solutions may likewise be rendered partially or wholly useless by microbic utilization. While the inorganic components of the aqueous solutions are not usually themselves susceptible, only very minor organic contaminants are necessary to promote spoilage and odor problems. In some few cases autotrophic type microorganisms cause severe problems even in pure inorganic type solutions.

Various means have been employed to safeguard organic substances from microbiological damage. Among these are heat sterilization and the incorporation of chemical preservatives. In the main, heat sterilization is impractical since either the materials to be protected cannot be readily sterilized thereby, or, if sterilized, cannot be economically or pratically kept in a sterile condition. Therefore, the incorporation of various chemical preservative additives has been found to afford the best type of protection from microbiological degradative action. Depending upon the adversity of the conditions of storage, chemical preservative may be added in varying amounts to protect the nutritive materials later used in the industrial process.

Many chemical preservatives have been employed throughout various industries. Among these are phenolic-type compounds, organomercury compounds, heterocyclic nitrogen compounds, quaternary ammonium compounds, and inorganic salts. Specifically, borax, polychlorinated phenols, phenyl mercuric acetate, copper-8-quinolinolate, copper sulfate, etc., are used.

In many cases, however, the use of known chemical preservatives has not always been entirely successful. Many problems have arisen through their use. Among these are adverse effects of the chemical preservative on the physical and chemical properties of the material to be protected. In addition, these same adverse effects may render the final product undesirable because of contaminant side effects. Also, while many of these preservatives prevent any substantial deterioration of the additive to be protected, they nevertheless present handling difficulties for industrial personnel. These known preservatives sometimes cause problems of toxicity and are sometimes dangerous to the skin and respiratory system of humans.

Many times, the chemical and physical characteristics of some of these chemicals present problems of solubility with the system being treated. Incompatibility with the system causes a wide variety of subsequent problems with regard to the final product itself. Odor problems oftentimes arise due to the inherent nature of the preservative.

A primary shortcoming of the majority of known chemical preservatives is their lack of adaptability to a wide variety of industrial systems. A treatment which proves to be successful in one instance may be unsatisfactory in another. The conditions and procedures used throughout the various industries differ widely as does the particular type of organic material to be preserved. For example, a chemical treatment of a carbohydrate composition may fail completely when applied to a protein or another different type of synthetic organic composition.

Accordingly, it would be a benefit to the art if a chemical treating agent could be synthesized, which is not susceptible to the above problems. In addition, it would be an advantage to devise a method of preserving certain organic materials susceptible to degradative microorganism attack, and be able to apply this one treatment to a whole spectrum of organic materials used in widely diversified industries.

Therefore, it becomes an object of the invention to provide chemical preservatives for various organic materials, and methods for treating these materials.

A further object is to provide unique chemicals which inhibit or prevent microorganism attack on organic nutrients, but nevertheless are non-injurious to the human organism.

Still another object is to provide a treatment which can be applied to a great number of organic nutrients susceptible to microbiological attack, and still not adversely affect either the organic nutrient or the base product to which it is subsequently added.

Yet another object is to provide a method of preservation of organic materials dispersed or solubilized in aqueous systems under a wide variety of conditions of light, heat, pH, etc.

A still further object is to provide novel compositions which will provide spoilage protection to industries which vary widely in the scope of their activities.

Another object is to provide non-odoriferous chemicals useful as preservatives, and methods of employing same which when used either alone or in a formulation with prerequisite solubility characteristics so as to be compatible with many aqueous systems to be treated and protected.

A more specific object is to provide chemical preservatives and the methods of protecting organic materials such as proteins, carbohydrates, and synthetic organic materials such as addition or condensation polymers which are stored for a considerable time prior to their incorporation into cellulosic fibrous materials such as paper.

Another specific object is the incorporation of preservatives into paint in order to afford adequate protection over long periods of time and under a wide variety of environmental conditions.

Still another object is the synthesis of a multipurpose class of chemicals which may be easily applied to an aqueous system to be inhibited from chemical deterioration, with relatively little toxicity hazard to the operator of such system and with limited resort to combinations with other treating agents.

Another object is to provide and furnish new chemicals which may be used to effectively treat fluid aqueous systems at low, economical dosages.

Other objects will appear hereinafter.

In accordance with the invention it has been discovered that the control and inhibition of the growth and reproduction of microorganisms in static systems which contain an organic water-dispersible fermentable nutrient susceptible to deterioration from said microorganisms, may be effected by the incorporation therein of an organic halomonoester alcohol. These esters, normally synthesized from a halogenated acid and a polyhydroxy alcohol may be chosen from a number of chemicals. For example, the acid reagent itself may be polyhalogenated or contain a single halogen atom. The alcoholic moiety of the ester reagent may be derived from such polymeric polyalcohols as polyvinyl alcohol and such alcohol-ethers as polyoxyalkylene glycols of varying molecular weights and chain lengths, as well as from monomeric polyalcohols of various types including synthetic compounds and naturally-occurring substances such as sugar, etc.

Preferred ester-alcohol compounds correspond to the type-formula:

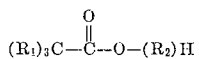

where $R_1$ is selected from the group consisting of halogen, hydrogen, lower alkyl, and lower halogenated alkyl. It is preferred that when $R_1$ is an alkyl or halogenated alkyl radical, it contains no more than 6 carbon atoms and most preferably no more than 3 carbon atoms. Thus, such lower alkyl groups as methyl, ethyl, propyl, isopropyl, butyl, isobutyl, secondary butyl, tertiary butyl, amyl, isoamyl, and halogenated derivatives of any of the foregoing may be employed. Also, at least one occurrence of $R_1$ must be halogen or a halogenated alkyl radical such as bromide, chloride, etc., or alkyl radical containing such halogen. $R_2$ is a radical selected from the group consisting of lower alkoxy, lower hydroxy alkoxy, and lower alkyl polyethers. Again, it is greatly preferred that the number of carbons in such radicals or in each recurring polyether unit, be less than 6 in number, and most preferably 3 or less. Thus, by the term "lower" whether applied to alkyl, alkoxy, hydroxy alkoxy, halogenated alkyl, or alkyl polyether radicals, is meant a substituted or unsubstituted hydrocarbon radical containing preferably from 1 to 6 carbon atoms and more preferably from 1 to 3 carbon atoms. The most preferred lower hydrocarbon radicals are groups containing either 2 or 3 carbon atoms. The carbon atoms, of course, need not necessarily be arranged in a straight chain configuration and the radicals may also have branched hydrocarbon radicals proceeding from their main or primary chain.

The more preferred water-soluble organic haloester alcohols have been found to fall within the following type-formula:

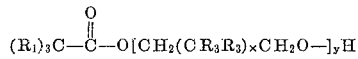

where $R_1$ is a radical of the type defined above, and $R_3$ is selected from the group consisting of hydrogen, lower alkyl radicals and hydroxy and lower hydroxyalkyl radicals with the proviso that only one occurrence of $R_3$ is hydroxy. $x$ is an integer of from 0 to 1, and $y$ is an integer from 1 to 8. Generally, when $x$ equals 1, $y$ will also equal 1. Again, when $R_3$ is a hydrocarbon radical, whether an alkyl group, substituted alkyl group, or a repeating alkyl ether group, it should contain less than 6 carbon atoms and most preferably less than 3 carbon atoms as discussed above.

The most preferred haloesters have been found to fall within the following specific type-formula:

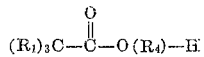

where $R_1$ is a radical as defined above, and $R_4$ is a radical selected from the group consisting of $CH_2CH_2O$, $CH_2CHOHCH_2O$ and $(CH_2CH_2O)_z$, where $z$ is an integer ranging from 2 to 8.

While the haloester alcohols may contain a varying number of atoms of different halogens, it is preferred that these materials contain bromine as the halogen constituent and most preferably a single bromine atom. Materials of this type have a low degree of toxicity and from a standpoint of manufacturing and handling ease are particularly suitable for use in the invention.

Specific organic monohaloesters useful in the process of the invention are set forth in Table I. The most preferred materials are

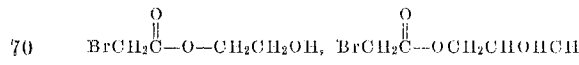

and

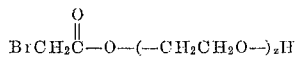

where $z$ is an integer ranging from 2 to 8.

TABLE I

| Composition No. | Chemical Name |
| --- | --- |
| 1 | 1-bromoacetoxyethanol-2. |
| 2 | 1-bromoacetoxypropanol-2. |
| 3 | 1-bromoacetoxypropanol-3. |
| 4 | 1-chloroacetoxypropanol-3. |
| 5 | 1-Chloroacetoxy-2-methylethanol-2 |
| 6 | 1-chloroacetoxyethanol-1. |
| 7 | 1-chloroacetoxypropanol-2. |
| 8 | 1-bromochloroacetoxyethanol-2. |
| 9 | 1-bromochloroacetoxyhexanol-6. |
| 10 | 3-chloro-2,2-dibromopropionoxybutanol-4. |
| 11 | 1,1-dibromoacetoxyethanol-2. |
| 12 | 2,2-dibromopropionoxybutanetriol-1. |
| 13 | 2,3-dibromopropionoxyethanol-2. |
| 14 | 2-dichlorobromoacetoxyethanol-1. |
| 15 | 1,1-trichloroacetoxyethanol-1. |
| 16 | 1,1,1-tribromoacetoxyethanol-1. |
| 17 | 1-iodoacetoxyethanol-1. |
| 18 | 1-fluoroacetoxyethanol-1. |
| 19 | $CH_2BrC(O)-O-(CH_2CH_2O)_{3-5}-H$ |
| 20 | $CH_2BrC(O)-O-(CH_2CH_2O)_{4-6}-H$ |
| 21 | Reaction product of polyvinyl-alcohol and bromoacetic acid. |
| 22 | Reaction product of glucose and bromoacetic acid. |
| 23 | Bromoacetoxypentaerythritol-1. |
| 24 | $CH_2BrC(O)-O-(CH_2CH_2O)_2-H$ |

As previously discussed, the above type compounds are most often conveniently formed by known esterification reactions involving a polyhydroxy compound and a halogenated carboxylic acid reactant. Generally, to form the monoester composition it is necessary to use excesses of the polyhydroxy reactant.

The monoester alcohols may be added to the system to be controlled in neat form, or in an aqueous or organic solution. Liquid solutions of the ester alcohols may contain other components such as dispersants and the like. For example, polyoxyalkylene adducts of long-chained aliphatic amines or alcohols may be suitably employed as dispersants. A typical compound of this type is known and trademarked as "Sterox AJ." In some cases, if an excess of polyhydroxy alcohol is used in synthesizing the monoester, the reaction product as such, containing excess alcohol as solvent, may be directly employed in treating the system without separation and purification of the active ingredient. No activity loss was noted in such a case.

At least a biostatic amount of the above microbiocidal organic halomonoester alcohol must be added to fermentable nutrients to inhibit their chemical deterioration due to static microbic attack while standing in storage. While the ester alcohol is preferably applied to a static aqueous system containing an organic nutrient which is capable of utilization by microbes, its efficiency however, is not limited thereto. Rather it may be effectively used over a broad spectrum of systems susceptible to chemical break-down or spoilage due to microorganisms.

Also, while any organic water-dispersible nutrient susceptible to fermentation by microorganisms may be effectively preserved from deterioration by adding at least a toxic amount of the microbiocidal ester, it has been determined that the particular organic substances most effectively protected are those selected from the group consisting of proteins, carbohydrates, and synthetic organic compounds. Of the latter, synthetic organic polymers are envisioned as being most suitably inhibited from chemical deterioration.

By the term "static microbic attack" as defined in the invention, is meant utilization and break-down of certain susceptible organic nutrients by microorganisms in their life cycle, as it takes place in a system which is substantially quiescent as opposed to a recirculating, continuous flow or agitated system. Ordinarily this attack or degradation by the microorganisms takes place in an aqueous system which is being held under conditions of storage. Generally the degradation of the nutrient, and subsequent created problems are accelerated under conditions of high humidity and increased temperature. Particularly, the problem of preserving becomes more difficult at temperatures above about 40° F., and more specifically above 60° F. In moist, hot climates preservation from spoilage becomes a most difficult problem.

By the term "fermentable nutrient" is meant a substance capable of chemical change brought about by the action of an enzyme or ferment. The microorganisms may change the nutrients whereby they are simplified chemically. This is normally done by catalytic agents produced by the organisms whether said catalytic agent is associated with the living microorganism or separated from it. Broadly speaking then, the invention encompasses the control of conditions whereby the organic matter is attacked and broken down in some manner by a wide variety of microorganisms.

Microbic attack is effected by a host of bacteria, fungi, and yeasts. Among these are such bacteria as *Pseudomonas aeruginosa*, *Aerobacter cloacae*, *Streptococcus faecalis*, *Bacillus pumilus*, *Micrococcus pyogenes*, *Bacillus subtilis*, *Aerobacter aerogenes*, *Bacillus mycoides*, *Desulfovibrio desulfuricans*, and fungi such as *Penicillium glaucum*, *Cephalosporium*, *Aspergillus terreus*, *Trichoderma* and *Aspergillus niger*.

The compositions of the invention protect a wide variety of organic nutrients and particularly proteins, carbohydrates and synethetic organic polymers. Among those protected are corn starch, potato starch, dextrin, polysaccharides, maltose, and simple sugars. Chemical breakdown of other substances such as casein, soya protein, zein, animal and fish glues, albumen, and blood proteins is also inhibited. In addition, such synthetic organic polymers as methyl cellulose, polyvinyl acetate, sodium carboxymethyl cellulose, polyacrylamide, polystyrene, polyvinyl chloride, polyvinylidene chloride copolymers, styrene-butadiene copolymers, acrylonitrile-butadiene copolymers, acrylates and acrylic polymers may be prevented from spoiling due to microbiological attack through the use of the polyhalogenated organic esters.

Also, grains such as malt, barley, etc., or inorganic substances such as clays and alum which contain contaminating amounts of nutrients sufficient to promote microorganism growth may be protected.

In effect then, almost any organic substances and particularly carbohydrates, proteins, or synthetic organic materials susceptible to degradation may be suitably preserved. Additives such as those used in coating and sizing of paper or substances used to impart suitable properties to paints, plastics, rubber latex, leather, etc., may be protected from degradative effects of microorganisms. For example, organic additives such as starch may be protected when used as a drilling mud additive. Various organic modifiers in the adhesive industry or those used in acoustical tile, joint cement for plastic board and dried cement for board, have been protected by using the compositions of the invention.

The method of incorporating the polyhalogenated esters into the system to be protected is simple and merely involves their addition either as a 100% active ingredient or contained in a solution such as an alcoholic solution or a suspension formulation, in an amount at least sufficient to render the microorganisms in the system ineffective. The amount of microbiocidal agent depends upon the particular system, but normally there is required at least one p.p.m. of the organic alcohol ester, this amount being based on the total weight of the system which contains the nutrients susceptible to attack. Depending upon the severity of the problem, amounts varying up to 25,000 p.p.m. may be required. In warm moist climates even more chemical reagent may be required to impart the requisite toxic effect upon the microorganisms in a given system.

With regard to the particular action of the ester compositions for the purposes of the invention, no distinction is made between their killing action or growth-arresting action. Either type or both types of action may take place depending upon the conditions of the environment to be treated and the severity of the problem. However, in any case, the esters act as toxic agents toward bacteria, fungi, and yeasts.

EVALUATION OF THE INVENTION

In order to determine the efficacy of the invention for preserving various types of organic nutrients under a wide variety of conditions and evironmental media, the following tests were run. 1-Bromoacetoxypropanol-2 was the particular chemical preservative treating agent used unless otherwise indicated. The dosages, as indicated in the examples, are based on the total weight of the particular system studied.

Example I

In this test a 12% solution of alum was prepared. To five aliquots of the alum solution were added 1, 5, 10, 15 and 25 p.p.m. of microbiocide. After 10 days the fungi count in each instance remained the same as it was originally at less than 10,000. The control sample, involving no microbiocidal treatment, had a fungi count of approximately 20,000 after 10 days.

Example II

In this test 3% aqueous solutions of corn and potato starch were first prepared. A number of samples of each were prepared to which were added varying levels of chemical. Retain control samples were also run. Table II below sets out bacterial counts of the treated and control samples of both starch sources after one and two weeks.

TABLE II

|  | 0.1 p.p.m. | 0.075 p.p.m. | 0.05 p.p.m. |
| --- | --- | --- | --- |
| Potato Starch: |  |  |  |
| 1 week | 10,000 | 10,000 | 10,000 |
| 2 weeks | 10,000 | 10,000 | 10,000 |
| Corn Starch: |  |  |  |
| 1 week | 10,000 | 10,000 | 10,000 |
| 2 weeks | 10,000 | 10,000 | 10,000 |
| Controls: |  |  |  |
| Potato Starch: |  |  |  |
| 1 week | $2 \times 10^7$ |  |  |
| 2 weeks | $2 \times 10^7$ |  |  |
| Corn Starch: |  |  |  |
| 1 week | $5 \times 10^7$ |  |  |
| 2 weeks | $5 \times 10^7$ |  |  |

Table II above shown that the 1-bromoacetoxypropanol-2 maintained the starch samples in a substantially free bacterial and fungal state, while the control sample quickly became contaminated due to utilization of the starch molecules by the bacteria and fungi contained within the aqueous dispersion. The control sample also had an off odor after one week's time, while the treated samples remained substantially non-odoriferous.

Example III

Samples of rosin size, protein and casein were treated with the 1-bromoacetoxypropanol-2 preservative at treatment levels ranging from 0.025 to 2.0% based on the weight of the sample. After there days' time the bacterial counts only rose slightly. Likewise, consistency of the sample remained as it was initially and no odors were developed. The control samples of the three types of materials in each case after two days time, showed a substantial rise in bacterial counts. For example, the protein control sample after two days showed proteinolysis and had a putrefactive odor. In addition there was a phase separation of the sample. The bacterial count of the protein control retain sample rose from $10^4$ to $10^7$.

Example IV

This example further illustrates the versatility of the alcohol esters with regard to their wide scope of protective use. A number of samples of butyl latex were treated with varying levels of 1-bromoacetoxypropanol-2. Bacterial counts were taken at 7 days, 14 days and 3 weeks. The amount of chemical added ranged from 0.05 to 0.1% by weight of the butyl latex samples. Even in case of lowest treatment level the bacterial count remained at all times below 10,000. The control on the other hand after three weeks showed a $1.5 \times 10^6$ bacterial count.

In order to further test the effectiveness of the compositions of the invention the activity of another representative organic alcohol ester was employed. In this case, 1-bromoacetoxyethanol-2 was tested. Two test methods were used involving species of bacteria and of fungi which normally cause trouble in aqueous systems under condition of storage. These test methods are set forth in detail below.

TEST METHOD.—GAS TUBE AND GROWTH INHIBITION

In this test the culture medium used consisted of 24 grams of dextrose, 1 gram of Basaminbact (Anheuser Busch), added to one liter of Chicago tap water and sterilized by autoclaving under 15 pounds of pressure for 15 minutes. The final pH of the autoclaved medium was $6.8 \pm 0.1$. An appropriate amount of 18 to 24 hour nutrient broth culture of *A. aerogenes* or spore suspension of *A. niger* was mixed with 200 ml. of the culture medium immediately before starting tests, to give an inoculated culture medium having one million organisms per ml. of medium. This inoculated culture medium was placed in each of a series of fermentation tubes with caps which contained the appropriate concentration of test chemical to give a final volume of test chemical and culture medium of 20 ml. in each tube. For this purpose the maximum volume of chemical introduced should be 0.5 ml. per tube of avoid chemical-solvent interference. Many solvent carriers of active materials are themselves somewhat effective, and efficient comparative testing requires that only small amounts of these solvents be introduced into the culture medium. The chemical and the inoculated medium were mixed gently. Two control tests were also run, one in which the chemical was omitted, and the second in the absence of inoculum. In mixing, tubes were inverted in the *A. aerogenes* gas inhibition study so as to fill the gas detection vials. The *A. niger* fungal growth inhibition study tubes were shaken. Inhibition ranges for *A. aerogenes* were determined by noting the presence or absence of gas production in the gas vials after 48 hours incubation of tubes at 90° F. The *A. niger* test tubes were incubated for 5 days at 30° C. and inhibition levels were determined by noting presence or absence of growth in the tubes at the end of this period of time.

In addition to the 48 hour inhibition test for *Aerobacter aerogenes* and 5 day inhibition test of *Aspergillus niger*, which results are given below, microbiological activity of 2-bromoacetoxyethanol-2 was also determined with regard to 1 and 24 hour killing ranges. As indicated in the above test method an appropriate amount of 18 to 24 hour nutrient broth culture of *A. aerogenes* or spore suspension of *A. niger* was mixed with 200 milliliters of culture medium so as to give an inoculated culture medium having 1 million organisms per milliliter of culture medium. This inoculated culture medium was then added to tubes containing appropriate amounts of test chemicals, the total final volume of test chemical and culture medium being 20 milliliters in each tube. The maximum amount of test chemical introduced was 0.5 milliliters per tube to avoid test chemical-solvent interference. The inoculated media and test chemical were then mixed gently i.e., tubes were shaken in the *A. niger* fungal growth inhibition study, and inverted in the *A. aerogenes* inhibition study to fill the gas detection vials. At the end of 1 and 24 hours contact with the test chemicals, portions of the liquid in the test were diluted 1000 fold to stop the chemical action. The diluted samples were then cultured into sterile culture tubes, incubated for 48–72 hours at 30° C. and examined for growth. Results of these tests then indicate the 1 and 24 hour killing ranges.

Using the above-described method of testing inhibition the treated samples gave good results. Specifically, both with respect to *A. aerogenes* after the 48 hour period and *A. niger* after the 5 day period, good gas inhibition at 10–25 p.p.m. of chemical was noted. On the other hand, gas production was noted in the control sample at 24 hours.

The alcohol ester preservative also gave good kill results against the *A. niger* and *A. aerogenes* microorganisms, while after a few days organism growth in the control sample was noticeable. The treated samples after one hour time gave good kill results of *A. aerogenes* and *A. niger* at the 100 p.p.m. level. After 24 hours the chemical gave kill of both the fungus and bacteria at 25–50 p.p.m.

In conclusion, it has been shown that the organic alcohol halomonoesters exhibit excellent bacterial, fungal, and yeast control with regard to systems under storage. This is especially true of aqueous systems which are highly susceptible to degradative break-down by these same microorganisms. Excellent preservative action has been shown over a broad spectrum of systems involving organic nutrients utilizable in microorganism life processes.

What is claimed is:

1. A composition substantially inhibited from chemical deterioration due to static microbic attack which comprises an organic water-dispersible fermentable paper additive susceptible to said deterioration and at least 1.0 p.p.m. of an organic haloester alcohol corresponding to the type-formula:

$$(R_1)_3C-\overset{O}{\underset{\|}{C}}-O[CH_2(CR_3R_3)_xCH_2O-]_yH$$

where $R_1$ is selected from the group consisting of halogen, hydrogen, lower alkyl and lower halogenated alkyl, with the proviso that at least one occurrence of $R_1$ contain halogen, $R_3$ is selected from the group consisting of hydrogen, lower alkyl radicals, hydroxy and lower hydroxyalkyl radicals, with the proviso that only one occurrence of $R_3$ is hydroxy, $x$ is an integer of from 0 to 1, and $y$ is an integer of from 1 to 8, with the proviso that when $x=1$, $y=1$.

2. The composition of claim 1 wherein said haloester is 1-bromoacetoxyethanol-2 which is present in the amount of at least 10 p.p.m., said amount being based on the total weight of a system containing said paper additive nutrient.

3. The composition of claim 1 wherein said ester is 1-bromoacetoxypropanol-2 which is present in an amount of at least 10 p.p.m., said amount being based on the total weight of the system containing said paper additive nutrient.

4. A composition substantially inhibited from chemical deterioration due to static microbic attack which comprises an organic water-dispersible fermentable paper additive selected from the group consisting of proteins, carbohydrates and synthetic organic polymers susceptible to said deterioration and at least 1.0 p.p.m. of a haloester alcohol corresponding to the formula:

$$(R_1)_3C-\overset{O}{\underset{\|}{C}}-O-(R_2)H$$

where $R_2$ is a radical selected from the group consisting of lower alkoxy, lower hydroxy alkoxy and lower alkyl polyether, and $R_1$ is selected from the group consisting of halogen, hydrogen, lower alkyl and lower halogenated alkyl with the proviso that at least one occurrence of $R_1$ contain halogen.

5. A composition substantially inhibited from chemical deterioration due to static microbic attack which comprises an organic water-dispersible fermentable paper additive nutrient susceptible to said deterioration and at least 1.0 p.p.m. of an organic haloester alcohol corresponding to the type formula:

$$(R_1)_3C-\overset{O}{\underset{\|}{C}}-O(R_4)-4$$

where $R_1$ is a radical selected from the group consisting of halogen, hydrogen, lower alkyl and lower halogenated alkyl, with the proviso that at least one occurrence of $R_1$ contain halogen and $R_4$ is a radical selected from the group consisting of $CH_2CH_2O$, $CH_2CHOHCH_2O$ and $(CH_2CH_2O)_z$ where $z$ is an integer ranging from 2 to 8.

6. The method of substantially inhibiting chemical deterioration of organic water-dispersible fermentable paper additives selected from the group consisting of proteins, carbohydrates and synthetic organic polymers, said additives being susceptible to static microbic attack, which comprises the step of adding to said additives at least 1.0 p.p.m. of an organic halomonoester alcohol, said amount based on the total weight of a system containing said additive, said ester corresponding to the type formula:

$$(R_1)_3C-\overset{O}{\underset{\|}{C}}-O-(R_2)H$$

where $R_2$ is a radical selected from the group consisting of lower alkoxy, lower hydroxy alkoxy, and lower alkyl polyether, and $R_1$ is selected from the group consisting of halogen, hydrogen, lower alkyl, and lower halogenated alkyl, with the proviso that at least one occurrence of $R_1$ contain halogen.

7. The method of substantially inhibiting deterioration of an organic water-dispersible fermentable paper additive nutrient susceptible to static microbic attack, which comprises the step of adding to said nutrient at least 1.0 p.p.m. of a water-soluble organic haloester alcohol, said amount being based on the total weight of a system containing said nutrient, said ester corresponding to the type formula:

$$(R_1)_3C-\overset{O}{\underset{\|}{C}}-O[CH_2(CR_3R_3)_xCH_2O-]_yH$$

where $R_1$ is selected from the group consisting of halogen, hydrogen, lower alkyl, lower halogenated alkyl, with the proviso that at least one occurrence of $R_1$ contain halogen and $R_3$ is selected from the group consisting of hydrogen, lower alkyl radicals, hydroxy and lower hydroxy alkyl radicals, with the proviso that only one occurrence of $R_3$ is hydroxy, $x$ is an integer of from 0 to 1 and $y$ is an integer of from 1 to 8 with the proviso that when $x=1$, $y=1$.

8. The method of claim 7 wherein said haloester is 1-bromoacetoxyethanol-2.

9. The method of claim 7 wherein said halomonoester is 1-bromoacetoxypropanol-2.

10. The method of substantially inhibiting chemical deterioration of an organic water-dispersible microorganism nutrient susceptible to static microbic attack which comprises the step of adding to said nutrient at least a biotoxic amount of a microbiocidal organic haloester alcohol corresponding to the formula:

$$(R_1)_3C-\overset{O}{\underset{\|}{C}}-O(R_4)-H$$

where $R_1$ is a radical selected from the group consisting of halogen, hydrogen, lower alkyl and lower halogenated alkyl, with the proviso that at least one occurrence of $R_1$ contain halogen, and $R_4$ is a radical selected from the group consisting of $CH_2CH_2O$, $CH_2CHOHCH_2O$, and $(CH_2CH_2O)_z$ where $z$ is an integer ranging from 2 to 8.

References Cited

B. Ferrara et al., C.A. 49, 8912g (1955).
N. Tecce, C.A. 49, 14198h (1955).
L. Paix, C.A. 51, 625d (1957).
B. Hansen, C.A. 51, 625e (1957).

H. G. Shirk et al., "The Influence of Chemical Structure on Fungal Activity," Archives of Biochemistry and Biophysics, 75, 31–39 (1958).

MORRIS O. WOLK, *Primary Examiner.*

JOSEPH SCOVRONEK, *Examiner.*

S. MARANTZ, *Assistant Examiner.*

UNITED STATES PATENT OFFICE
CERTIFICATE OF CORRECTION

Patent No. 3,393,042
July 16, 1968

David Y. L. Liu

It is certified that error appears in the above identified patent and that said Letters Patent are hereby corrected as shown below:

Column 4, lines 69 and 70, the formula should appear as shown below:

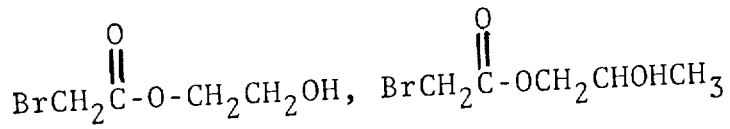

Column 11, line 5, "8912g" should read -- 1982g --.

Signed and sealed this 21st day of April 1970.

(SEAL)

Attest:

Edward M. Fletcher, Jr.
Attesting Officer

WILLIAM E. SCHUYLER, JR.
Commissioner of Patents